No. 764,032. PATENTED JULY 5, 1904.
D. N. BERTRAM & S. MILNE.
MACHINE USED IN THE MANUFACTURE OF PAPER.
APPLICATION FILED MAR. 17, 1902.
NO MODEL. 2 SHEETS—SHEET 1.

Witnesses:
John Camb.
Arthur Barlow.

Inventors:
David Noble Bertram.
Samuel Milne
By their Attorney: Walter Gunn

No. 764,032. PATENTED JULY 5, 1904.
D. N. BERTRAM & S. MILNE.
MACHINE USED IN THE MANUFACTURE OF PAPER.
APPLICATION FILED MAR. 17, 1902.
NO MODEL. 2 SHEETS—SHEET 2.

Witnesses:
John Camp
Arthur Barlow,

Inventors:
David Noble Bertram.
Samuel Milne
By their Attorney: Walter Gunn.

No. 764,032. Patented July 5, 1904.

UNITED STATES PATENT OFFICE.

DAVID NOBLE BERTRAM AND SAMUEL MILNE, OF EDINBURGH, SCOTLAND.

MACHINE USED IN THE MANUFACTURE OF PAPER.

SPECIFICATION forming part of Letters Patent No. 764,032, dated July 5, 1904.

Application filed March 17, 1902. Serial No. 98,689. (No model.)

*To all whom it may concern:*

Be it known that we, DAVID NOBLE BERTRAM and SAMUEL MILNE, subjects of the King of Great Britain and Ireland, and residents of Edinburgh, Scotland, have invented new and useful Improvements Relating to Machines Used in the Manufacture of Paper, Paper-Pulp, and the Like, of which the following is a specification.

This invention relates to improved apparatus for producing a vacuum in the vacuum-boxes of paper-making and like machines; and its object is to utilize the water drawn from such boxes for the purpose of producing and maintaining the said vacuum, also to use some of the same water for diluting the pulp on the paper-machine and to use the remainder in the beating-engines or otherwise. Our invention, however, contemplates the use of the water for producing the vacuum only, the excess being run off into a special receptacle.

Figure 1:
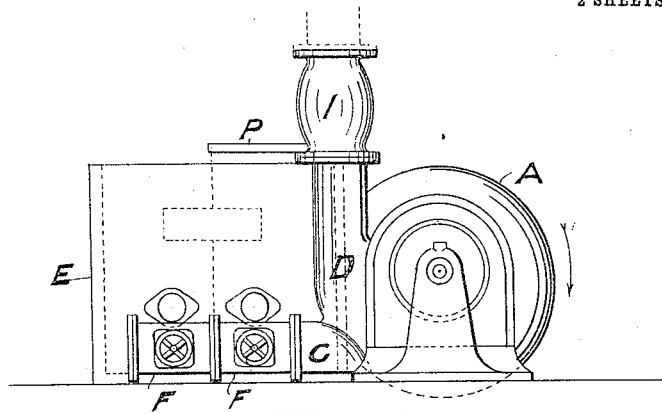
Figure 2:
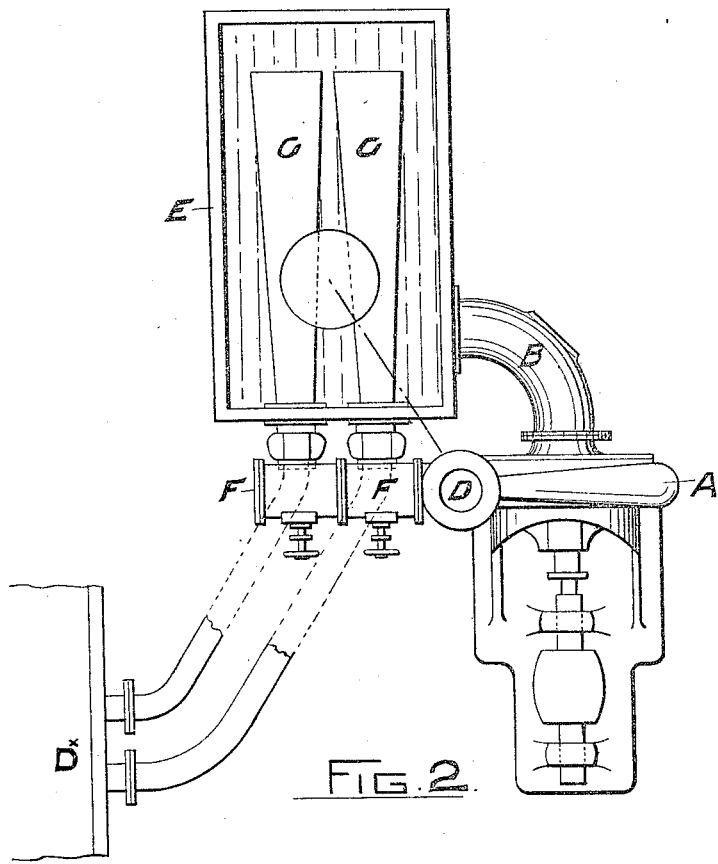
Figure 3:
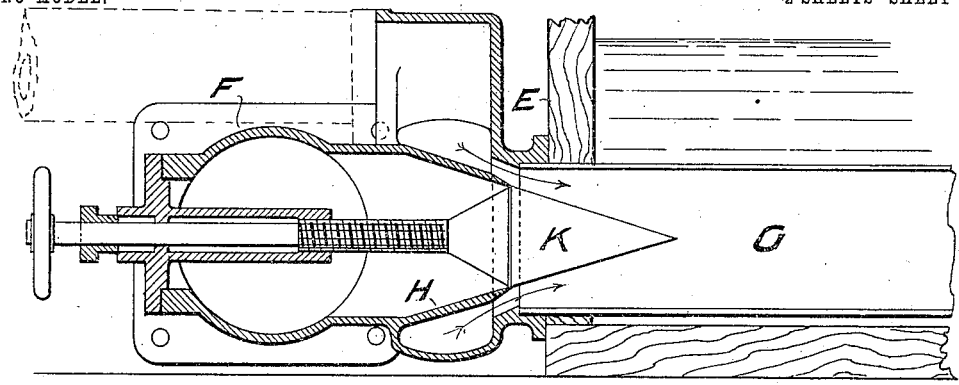
Figure 5:
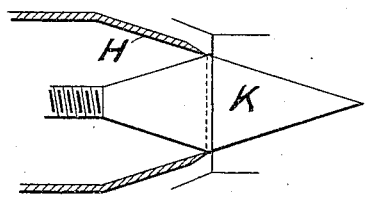
Figures 6, 7:
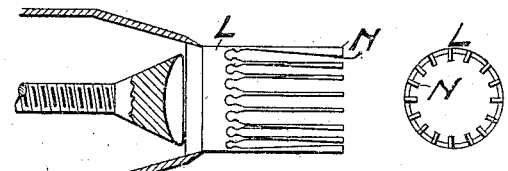
Figures 4, 9:
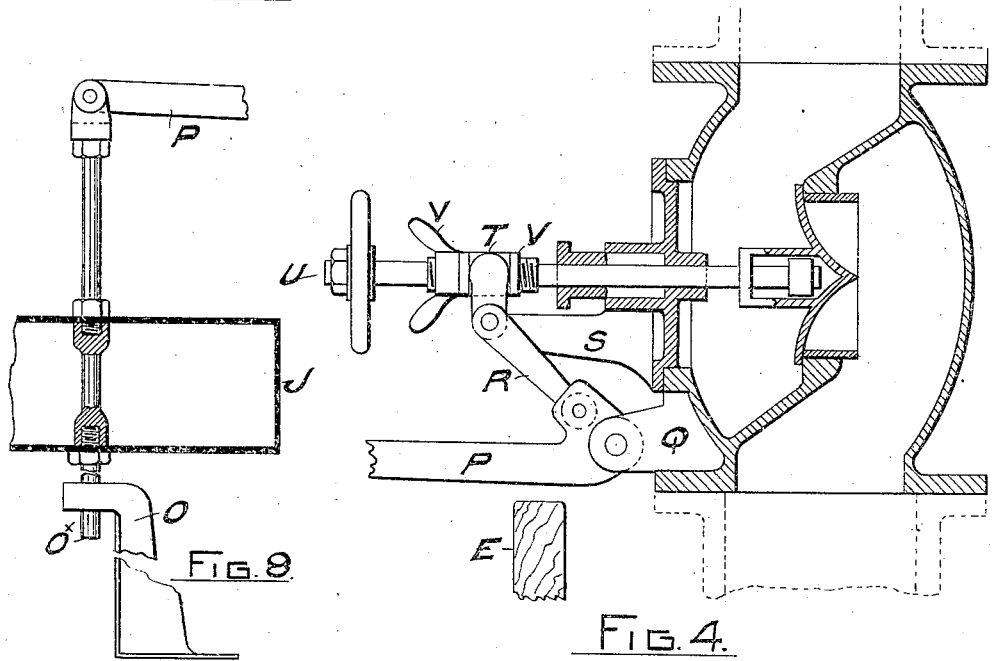

On Sheet 1 of the accompanying drawings, Figure 1 illustrates a front elevation, and Fig. 2 a plan, of our improved vacuum-producing and water-circulating apparatus. On Sheet 2, Figs. 3 and 4 illustrate longitudinal sections of important detail parts. Figs. 5, 6, and 7 illustrate modifications, and Fig. 8 a detached part of Fig. 4.

According to our invention we employ a rotary pump A, having one inlet branch B and two outlet branches C and D. The branch B we connect to a tank E, the branch C to a set of ejector-boxes F, and the branch D to a pipe leading to the mixing-box of the paper-making machine $D^x$ and to an overhead tank. (Not shown.)

The ejector-boxes F each communicate by a tube (shown dotted in Fig. 2) with a suction-box of the paper-making machine, and each ejector delivers into the tank E through spouts or delivering-nozzles G, which are by preference of oval section and tapered laterally.

With the pump set in motion and the tank E supplied with water at the start it extracts such water from the tank and impels it partly through the branch C and partly through the branch D. That which flows through the branch C passes through the ejector-nozzles H and back into the tank, thereby creating a vacuum in the pipes or tubes leading from suction-boxes and extracting the water from such boxes, which then flows under the said ejection action into the tank E and serves to maintain the supply of water for working the ejectors. That portion of the water which passes through the branch D flows upward until it reaches a further branch, through which it then flows into the mixing-box for diluting the mixture of pulp for the paper-making machine. Part of such water also passes upward into the overhead tank aforesaid, from whence it then flows into the beating-engines or elsewhere, as desired.

To give the requisite "head" of pressure for working the ejectors, we employ a check-valve I, (see Fig. 4,) capable of being adjusted by hand and capable also of being adjusted automatically by a float J in the tank E. By a partial closing of the valve the flow of the water through branch D is retarded and a greater pressure thus put on the water working the ejectors, while by opening the valve the pressure is reduced and less water passes to the ejectors.

By varying the speed of the pump the rate of delivery and the height to which the water is elevated is variable.

As a modification the pump may be elevated above the tank E, or the branch C may be upon the branch D just below the valve I. Likewise the tank may be elevated above the pump and work the ejectors by gravity; but we prefer the arrangement shown.

The ejector-boxes or casings F are so constructed that connecting-pipes are not necessary, the inlet branch of each being sufficiently large to supply two or more ejectors and being connected up direct to the inlet branch of the next adjoining box or casing, as shown in Fig. 2, thus making a very neat arrangement which takes up small space and which is easily kept clean.

The ejectors may be of the construction shown in Fig. 3, with the ejector-cone K working within the nozzle H or working against the narrower end of the nozzle, as shown in Fig. 5.

To break up the jet into a number of streams, and thus allow it to act more effectually on the air and water, we provide a brass tube L with twisted teeth or blades N, formed by slotting the tube longitudinally and then giving each blade a quarter-turn. We also cut short the spindle-cone and hollow out the wider end, as shown. The effect of this arrangement is to allow air to get to the center of the jets of water and both inside and outside and to greatly improve the ejection.

To steady the action of the float, we provide it with a guide-bracket $O^\times$, fixed to the floor of the tank E, and a guide-rod O, working in such bracket. The movement of the float is imparted to the check-valve through lever P, fulcrumed on bracket Q, lever R, fulcrumed on bracket S, and a block T on spindle U, held in position by nuts V.

Although preferring to use the excess water for the mixing-box and beaters, and thereby avoiding waste of valuable substances that may be in the water, it will be seen that we may omit the branch D and valve I and simply circulate the water through and through the tank E, an overflow-opening being provided to get rid of the excess, and while preferring the particular constructions of ejectors and valve-operating mechanism aforesaid other constructions may be employed without departing from our invention, and

What we claim is—

1. In apparatus for extracting water and air from the vacuum-boxes of paper-making machines, tank E, ejector-boxes F connected to and opening into the said tank, also connected to and opening into each other, and each comprising a nozzle H and a valve K, a conical delivery-pipe for each ejector extending into the tank, a pipe leading from each of the said ejector-casings to the vacuum-box of the paper-making machine, a rotary circulating-pump with two outlet branches and one inlet branch, a pipe connecting the said inlet branch with the tank, and one of the outlets connected with one of the ejector-casings and another with a delivery-pipe, a valve through which the surplus water is passed, and a float in the said tank which controls the action of the valve, as set forth.

2. In means for producing vacuum in the vacuum-boxes of paper-making machines, a tank E, ejector-casings F secured to said tank and formed for connection to pipes leading from the vacuum-boxes of the machine, and said ejector-casing comprising a nozzle H and valve K and the said casings connected and opening into each other, and a conical delivery-pipe for each ejector, substantially as set forth.

3. In means for producing a vacuum in the vacuum-boxes of paper-making machines, a rotary circulating-pump with one inlet branch B and two outlet branches C D, a tank E and a set of ejectors secured to the tank, and the branch B of the pump secured to the tank E and the branch C to the ejectors, while the branch D acts as a delivery-pipe, as set forth.

In witness whereof we have hereunto set our hands in the presence of two witnesses.

DAVID NOBLE BERTRAM.
SAMUEL MILNE.

Witnesses:
WILLIAM HENRY MOFFATT,
JOHN INNES MELVIN.